(12) United States Patent
Benninger et al.

(10) Patent No.: US 7,691,468 B2
(45) Date of Patent: Apr. 6, 2010

(54) METHOD AND MEANS FOR PRODUCING A MAGNETICALLY INDUCED DESIGN IN A COATING CONTAINING MAGNETIC PARTICLES

(75) Inventors: Nathalie Benninger, La Chaux-de-Fonds (CH); Claude-Alain Despland, Lausanne (CH); Pierre Degott, Crissier (CH); Edgar Müller, Fribourg (CH)

(73) Assignee: SICPA Holding S.A., Prilly (CH)

( * ) Notice: Subject to any disclaimer, the term of this patent is extended or adjusted under 35 U.S.C. 154(b) by 945 days.

(21) Appl. No.: 10/560,603

(22) PCT Filed: Jun. 29, 2004

(86) PCT No.: PCT/EP2004/007028

§ 371 (c)(1),
(2), (4) Date: Dec. 13, 2005

(87) PCT Pub. No.: WO2005/002866

PCT Pub. Date: Jan. 13, 2005

(65) Prior Publication Data

US 2006/0150854 A1 Jul. 13, 2006

(30) Foreign Application Priority Data

Jul. 3, 2003 (EP) ................................. 03015090

(51) Int. Cl.
*B32B 5/16* (2006.01)
*G03G 19/00* (2006.01)
*H01F 1/01* (2006.01)
*B42D 15/10* (2006.01)

(52) U.S. Cl. ........................ 428/206; 428/208; 428/328; 428/900; 428/916; 427/547; 427/550; 427/598; 427/128; 427/130; 283/82; 346/74.3; 346/74.5

(58) Field of Classification Search .............. 428/195.1, 428/328–329, 402, 900, 206, 208, 916; 283/82; 427/550, 128, 130, 547, 598; 346/74.3, 74.5
See application file for complete search history.

(56) References Cited

U.S. PATENT DOCUMENTS 2,418,479 A * 4/1947 Pratt et al. .................. 427/550
2,999,275 A * 9/1961 Blume, Jr. .................. 156/243

(Continued)

FOREIGN PATENT DOCUMENTS

DE 19942216 3/2001

(Continued)

*Primary Examiner*—Mark Ruthkosky
*Assistant Examiner*—Gerard T Higgins
(74) *Attorney, Agent, or Firm*—Shoemaker and Mattare

(57) ABSTRACT

The invention discloses a device and a method for transferring a predeterminable, high-resolution magnetic design onto a document printed with a magnetic ink, in particular a magnetic optically variable ink. The device comprises a body of a composite permanent-magnetic material, having at least one flat or curved surface engraved with indicia corresponding to the design to be transferred, wherein the said magnetic material is permanently magnetized, preferably in a direction substantially perpendicular to the said surface. The method comprises imprinting or coating a first surface of a sheet or web with a magnetic ink or coating composition, and approaching the imprinted sheet or web to the engraved surface of a body of magnetized composite permanent-magnetic material while the ink is wet, followed by hardening the ink.

37 Claims, 7 Drawing Sheets

U.S. PATENT DOCUMENTS

Figure 1A:
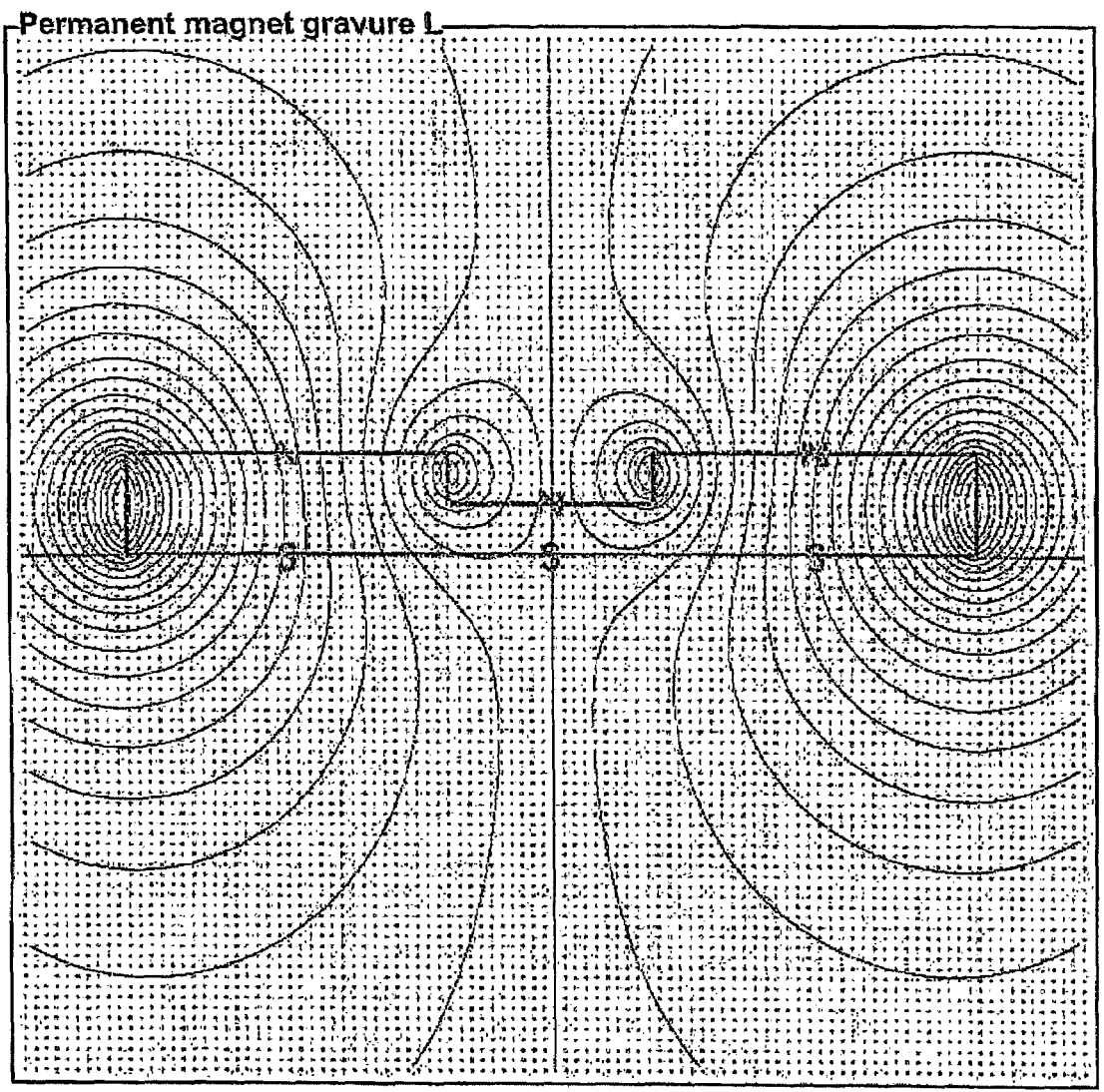

| | | | |
|---|---|---|---|
| 3,011,436 A | | 12/1961 | Berry |
| 3,221,315 A | * | 11/1965 | Brown, Jr. et al. ............. 430/56 |
| 3,257,944 A | * | 6/1966 | Gray ........................ 101/401.1 |
| 3,458,311 A | * | 7/1969 | Alles ........................ 430/273.1 |
| 3,676,273 A | | 7/1972 | Graves |
| 3,869,711 A | | 3/1975 | Bernard et al. |
| 3,878,367 A | | 4/1975 | Fayling et al. |
| 3,887,478 A | * | 6/1975 | Eadie ........................ 252/62.63 |
| 4,511,616 A | | 4/1985 | Pitts et al. |
| 5,079,058 A | | 1/1992 | Tomiyama et al. |
| 5,201,268 A | * | 4/1993 | Yamamoto et al. .......... 101/170 |
| 5,223,360 A | | 6/1993 | Prengel et al. |
| 5,364,689 A | * | 11/1994 | Kashiwagi et al. ....... 428/195.1 |
| 6,403,169 B1 | | 6/2002 | Hardwick et al. |
| 2002/0182383 A1 | * | 12/2002 | Phillips et al. ............... 428/199 |
| 2004/0051297 A1 | * | 3/2004 | Raksha et al. ................. 283/57 |

FOREIGN PATENT DOCUMENTS

| | | | |
|---|---|---|---|
| EP | 0406667 | | 1/1991 |
| EP | 0556449 | | 8/1993 |
| EP | 0686675 | | 12/1995 |
| EP | 0710508 | | 5/1996 |
| EP | 1126443 | | 8/2001 |
| JP | 56002186 | | 1/1981 |
| JP | 04086281 | | 3/1992 |
| JP | 11152437 A | * | 6/1999 |
| JP | 2000233560 | | 8/2000 |
| JP | 2001347763 | | 12/2001 |
| JP | 2002254787 | | 9/2002 |
| WO | WO 02-09002 | | 1/2002 |
| WO | WO 02/090002 | | 11/2002 |

* cited by examiner

METHOD AND MEANS FOR PRODUCING A MAGNETICALLY INDUCED DESIGN IN A COATING CONTAINING MAGNETIC PARTICLES

FIELD OF INVENTION

The invention is in the field of security document printing. It concerns a novel means for transferring a security design into magnetic ink, in particular magnetic color-shifting ink, and a method to realize said design.

STATE OF THE ART

Markings exhibiting a viewing-angle dependent light reflection spectrum ("optically variable devices", OVDs) are used as an efficient anti-copy means on bank notes and security documents. Among the OVDs, optically variable inks (OVI®; EP 227,423 B1) have acquired a preeminent position since their first introduction on currency back in 1987. Such inks are formulated on the basis of optically variable pigment (OVP), a preferred type of OVP being the flaky thin-film optical interference device described in U.S. Pat. No. 4,705,300; U.S. Pat. No. 4,705,356; U.S. Pat. No. 4,721,217; U.S. Pat. No. 4,779,898; U.S. Pat. No. 4,930,866; U.S. Pat. No. 5,084,351 and in related disclosures. Other useful types of OVP comprise the multiply coated particles described in U.S. Pat. No. 5,624,486 and U.S. Pat. No. 5,607,504, and the thin film cholesteric (i.e. chiral-nematic) liquid crystal pigments described in U.S. Pat. No. 5,807,497 and U.S. Pat. No. 5,824,733.

Optically variable printed features on security documents such as bank notes are aimed primarily for authentication of the document by the unaided human eye, through a checking of the feature's spectral reflection properties, i.e. its color, at two or more different angles of view, at least at a near-orthogonal and at a near-grazing view. Said angle-dependent color is a "simple message" of authenticity, which cannot be reproduced without having access to the source of the optically variable pigment, and which can rapidly and easily be checked by the "man on the street", and this largely independent of his level of education.

In recent times, non-security optically variable pigments and coating compositions have increasingly shown up on the open market, freely sold for the most various applications, especially in the field of decorative arts. Although these non-security optically variable pigments and coating compositions do not display the same colors and color-shifts as the optically variable inks used on banknotes, they have nevertheless the effect of perturbing the "simple message" of authenticity, which was the principal trump of the optically variable inks at the moment of their introduction to security printing. The "man on the street" will from now on need to be educated in distinguishing a genuine optically variable ink on a banknote from a decorative optically variable coating.

The technical problem to be solved in this context is to find a next-generation upgrade for optically variable ink on bank notes and security printing products. This upgrade should fulfill the following three requirements:

i) It should carry a "simple message" of authenticity which can be rapidly and easily checked by the "man on the street", independent of his level of education;

ii) It should not be reproducible without having access to the source of the particular optically variable pigment;

iii) It should not be under pressure from another potentially large market or industrial application.

The stated technical problem can be solved by the use of magnetic optically variable pigment in a printing ink, in conjunction with an orientation of the magnetic optically variable pigment particles in the printing process through the application of appropriate magnetic fields. This solution responds to the three requirement stated above:

i) The magnetic orientation of the optically variable pigment in the ink after printing results in an easily recognizable "magnetic design" for the "man on the street", which can only be achieved by using an on-purpose-manufactured magnetic optically variable pigment. The optically variable pigments and coating compositions which are sold for decorative applications are not suited for magnetic orientation;

ii) The combination of optically variable and magnetic properties in a same pigment is not feasible without having access to the manufacturing of the optically variable pigment;

iii) The magnetic optically variable pigment is more expensive in manufacturing than ordinary optically variable pigment, and the imparting of the magnetic design requires the printing machine to be equipped with supplementary technology for magnetic orientation. The optical effect of the magnetic design is furthermore far less appealing to the decorative market than the optically variable effect itself. It is thus not expected that magnetic optically variable inks will ever have any substantial market potential outside the very field of security printing.

Magnetic optically variable pigments which can be used for the embodiment of the invention have been disclosed in U.S. Pat. No. 4,838,648; in EP 686,675 B1; as well as in WO 02/73250 A2 and in WO 03/00801 A2; the latter two describe the best suited pigments to solve the stated technical problem.

Methods and technology for the orientation of magnetic particles in coating compositions have been disclosed in the prior art, noteworthy in U.S. Pat. No. 3,676,273; U.S. Pat. No. 3,791,864; EP 406,667 B1; EP 556,449 B1; EP 710,508 A1 and WO 02/90002 A2; the latter being the closest prior art to the present application. None of these methods has proved suited, however, for the transfer of a high-resolution magnetic pattern in a high-speed printing process.

SUMMARY OF THE INVENTION

The present invention is in particular about a novel way of applying magnetic fields for orienting magnetic particles in a printed ink during the printing process.

The present invention addresses furthermore the technical problem of obtaining a customer-specific high-resolution magnetic design on the printed article in an easy-to-implement and highly reliable way.

It was surprisingly found that a high-resolution magnetic design or image can be transferred with a simple device to an applied, wet coating composition comprising magnetic or magnetizable particles.

The device for magnetically transferring indicia, such as a design or and image, comprises a body of magnetized permanent-magnetic material, preferably a composite material such as a polymer-bonded composite. One magnetized surface of this material serves to transfer indicia, such as a design or image, to a wet coating on a substrate, such as a sheet or web. The device is characterized in that the surface of said permanently magnetized body carries indicia in the form of irregularities of the surface, particularly deepenings or heightenings. In this context, the surface may be flat or curved, particularly in a first dimension and not curved in a second dimension perpendicular to the said first dimension. Furthermore, the transfer surface may be designed to be directly brought into contact with the substrate, which may be a sheet or web.

The device, which is preferably magnetized in a direction perpendicular to its surface carrying indicia, transfers the engraved pattern as a high-resolution magnetic image onto a sheet or web carrying a layer of a freshly applied and still wet magnetic ink or coating composition, when the said sheet of web is approached sufficiently closely to the said engraved surface. After drying or hardening the so oriented ink or coating composition, the transferred magnetic image on the imprinted sheet or web remains fixed.

Permanent magnetic fields can be produced by using known composite magnetic materials. Irregularities in the surface of such a magnetized permanent-magnetic body produce sharp changes in the direction and strength of the resulting magnetic field. Obviously, the irregularities can consist of protrusions or heightenings and/or deepenings, such as holes or grooves in various forms. These irregularities may further be produced by adding material to the surface or by taking off material from the surface of the body. Taking off material can be effectuated, for example, by engraving the permanent magnetic body, as known from the art of making Intaglio plates. Alternatively, a letterpress-type of engraved body can be realized as well. If a flat surface is required, the body may be leveled or covered by applying an appropriate non-magnetic material to the surface. For example, the body can be covered by plastic material to achieve a flat and smooth outer surface and cover the irregularities of the engraved indicia.

Alternatively, permanent-magnetic material may be applied to the surface in order to achieve said irregularity. This can be done, for example, by applying a magnetic material to the surface of the permanent magnet in certain areas, and to cover subsequently the whole surface with a non-magnetic material, such as a plastic.

One of the major advantages of the device according to the invention is that the indicia to be transferred can be defined at will by an appropriate choice of the engraving. The device can be realized using any mechanically workable permanent-magnetic material, such as permanent-magnetic composite materials, comprising a brittle permanent magnetic powder in a malleable metal- or polymer-matrix. Furthermore, the device can most easily be implemented as an engraving in a polymer-bonded body of permanent-magnetic material (Plastoferrite).

Alternatively, a polymer-bonded magnetic composite material may be filled, in a liquid or pasty state, into a form which has a negative of the desired indicia. After hardening of the polymer, the surface of the resulting magnetic body carries the indicia transferred by the form. However, the preferred embodiment of the invention is to provide a pre-formed body of magnetic material and to apply the surface irregularities, representing indicia, afterwards in accordance with the specific requirements of use.

A polymer-bonded body of magnetic material, in the context of the present disclosure, is a composite material comprising a rubber- or plastic-like polymer as a structural binder, and a permanent-magnetic powder material as an extender or 'filler'. Preferred polymer binders include rubber-type flexible materials such as nitrile rubber, Nordel® (EPDM hydrocarbon rubber), and Natsyn® (poly-isoprene), as well as Nylon 6 (poly-caprolactam), Nylon 12 (poly-laurolactam), polyamide, poly-phenylene sulfide (PPS), epoxy resins, and Hypalon® (chlorosulfonated polyethylene). Preferred permanent magnetic powder materials include cobalt, iron and their alloys, chromium dioxide, magnetic oxide spinels, magnetic garnets, magnetic ferrites including the hexaferrites such as calcium-, strontium-, and barium-hexaferrite ($CaFe_{12}O_{19}$, $SrFe_{12}O_{19}$, $BaFe_{12}O_{19}$, respectively), alnico alloys, samarium-cobalt (SmCo) alloys, and rare-earth-iron-boron alloys (such as NdFeB), as well as permanent-magnetic chemical derivatives based on these structure types and mixtures including them. Polymer-bonded bodies of magnetic materials are obtainable from many different sources, such as from Group ARNOLD (Plastiform®) or from Materiali Magnetici, Albairate, Milano, IT (Plastoferrite).

The said magnetic powder material can either be magnetically isotropic or magnetically anisotropic. In the case of magnetically anisotropic powder materials, the magnetic powder particles are preferably oriented in the matrix or binder so as to determine a preferred direction of magnetization, chosen perpendicular to the engraved, extended surface of the magnetic sheet. Isotropic polymer-bonded bodies of magnetic materials, in turn, can be magnetized equally well in all directions.

Bodies of permanent-magnetic composite materials advantageously combine the desirable magnetic properties (high coercivity) of the otherwise brittle and not well workable ferrite, Alnico, rare-earth or still other magnets with the desirable mechanical properties (flexibility, machine-ability, shock-resistance) of a malleable metal or a plastic material. The body of a magnetic composite material can be obtained in any desired size and form, e.g. as a thin, flexible plate which can be bent and mechanically worked, e.g. cut to size, using commonly available mechanical ablation tools and machines, as well as air- or liquid-jet ablation tools, or laser ablation tools. The engraving of the body of composite permanent-magnetic material may be achieved by any way and method known in the art, by hand-engraving, by mechanical engraving machines, as well as by computer-controlled engraving stations which, furthermore, may produce the engraving either with the help of mechanical tools, or with gaseous or liquid jets of abrasives, or through laser-ablation, using e.g. $CO_2$—, Nd—YAG or excimer lasers.

According to the invention, a sheet- or plate-like body of a composite permanent-magnetic material, preferably an anisotropically oriented one, is engraved and magnetized preferably in a direction substantially perpendicular to the engraved surface of the sheet.

Substantially perpendicular, in the context of the present invention, means a direction which is not deviating more than 30° from perpendicular direction.

According to the invention, user-defined indicia are engraved into at least one surface of the said body of permanent-magnetic composite material. The engraving can hereby take place either before or after the magnetization operation. The engraving must be sufficiently deep, in order to create a significant perturbation of the magnetic field at the surface. Said perturbation of the magnetic field, which is due to the local lacking of magnetic material, manifests itself in a bending of the field lines, which, in turn, are able to correspondingly orient magnetic particles in a wet coating composition on a printed item, when this latter is brought into sufficient proximity of the device, e.g. placed on top of, the engraved magnetic device.

Said engraved and magnetized body may be a flat plate, or, alternatively and preferred, a cylindrically curved plate, applied around the periphery of a rotatable cylinder on a printing machine, for the continuous transfer of a magnetic design onto printed documents at elevated speed. Said flat or curved plate may further be mounted on any type of support.

Said engraving in said plate or body may be filled up with a polymer, which may contain fillers. Said filler may be a soft magnetic material, for modifying the magnetic flux at the locations of engraving, or it may be any other type of magnetic or non-magnetic material, in order to modify the magnetic field properties, or to simply produce a smooth surface. The plate or body may additionally be surface-treated for facilitating the contact with the printed goods, reducing friction and/or wear and/or electrostatic charging in a high-speed printing application.

The invention can be practised on any type of imprintable sheet or web material, in particular on the materials used for producing a bank note, a value paper, an official document, a tax excise stamp, a label, a foil, a thread or a decal. The imprintable sheet or web material may further be of paper or of polymer (such as PE, PP or PVC), and it may comprise a single layer, as well as a plurality of layers.

The inventors believe that the effect of the engraving onto the magnetic field can be explained as follows (with reference to the magnetic field simulation depicted in FIG. 1a): A plate-like body of permanent-magnetic material P is magnetized in a direction perpendicular to its extended surface, such as to result in a first face being a magnetic North pole (N), and in a second face being a magnetic South pole (S). The lines of magnetic field, according to the definition, radiate out of the North pole (N) and into the South pole (S). An engraving is realized in one of the pole regions of the said plate (the North pole in the depicted case).

At the location of engraving, magnetic field-generating material is missing, and the magnetic N-potential at the bottom of the engraving is lower than the magnetic N-potential at the unengraved surface. The magnetic field lines in the vicinity of the engraving bend in consequence down, such as to point towards the bottom of the engraving which is at a lower magnetic N-potential and represents therefore a local South pole with respect to the unengraved surface. A sharp magnetic field transition, equivalent to a N-S-N magnetic pole arrangement, is thus produced at the location of engraving. In other words: The engraving of one pole (e.g. the North pole) of a magnetized permanent-magnetic material takes the opposite magnetic polarity (e.g. that of a South pole)!

Figure 1B:
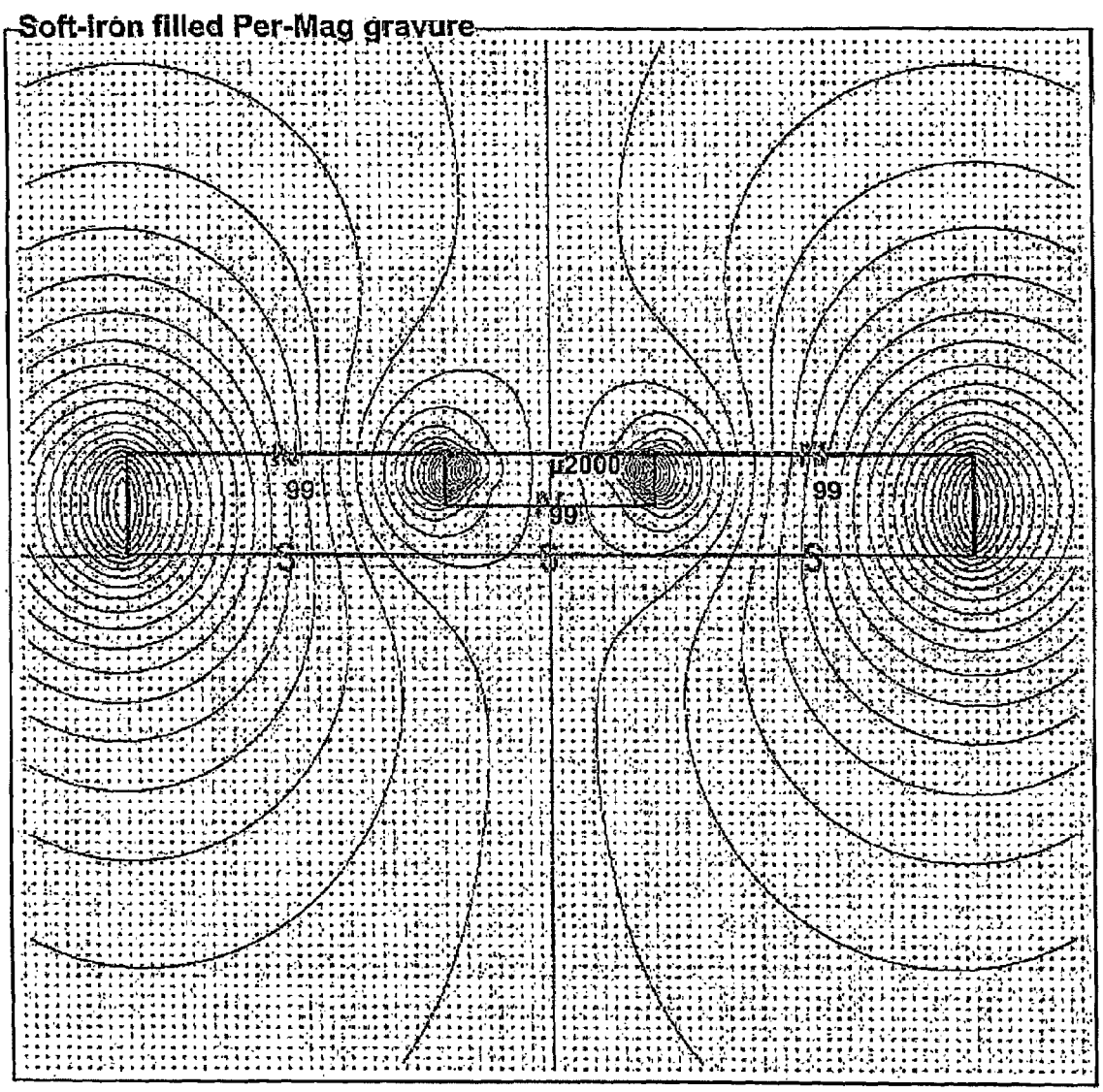

In an alternative embodiment, and with reference to the magnetic field simulation depicted in FIG. 1b, the engraving in the permanent-magnetic body may also be filled up with another material. Said filling material may e.g. be a polymer having similar mechanical properties as the said body of permanent-magnetic composite. Filling up the engraving renders the engraved plate a smooth surface again, which is of advantage during the printing and magnetic image transfer operations. Said filling polymer may furthermore contain an extender, which may be either chosen from nonmagnetic materials, such as $CaCO_3$ or $TiO_2$, or from magnetic materials, such as soft-magnetic iron or low-magnetic-remanence materials. The depicted device is the same as the engraved permanent-magnetic plate of FIG. 1a, but additionally having the engraved gap filled with $\mu=2000$ soft-magnetic iron. The magnetic field transition at the engraving is qualitatively the same as in the absence of an iron filling, albeit somewhat sharper defined due to the field concentration by the soft-magnetic iron.

Figure 1C:
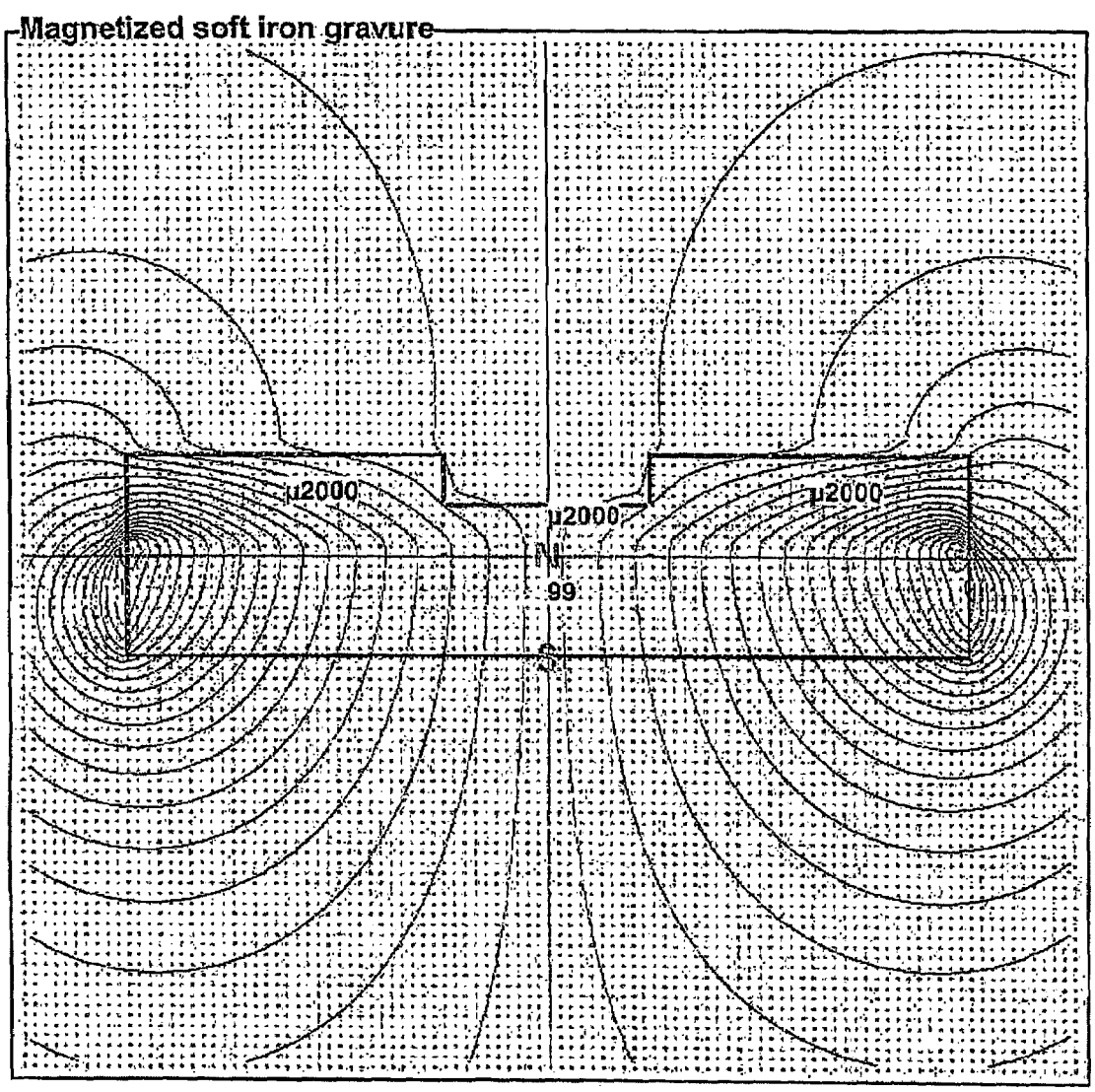

FIG. 1c depicts the magnetic field simulation of a device disclosed in the prior art (WO 02/90002 A2, p. 27-28), wherein a magnetizable die, e.g. a soft-magnetic iron die with a cut-out or relief image on one surface thereof is exposed to a magnetic field focussed on the die (represented in the figure by an S-N permanent magnet (99) placed underneath the engraved $\mu=2000$ soft-magnetic iron die). No sharp local N-S-N magnetic field transition is produced across the engraving, but rather only a gradual change in the magnetic field density, which gives rise to the kind of unsharp orientation effects cited in the mentioned prior art. This device of the prior art is thus not capable of transferring sharp magnetic images, such as a text or a drawing, to a magnetic printing.

The engraved features must be sufficiently large and deep, in order to allow the resulting local magnetic field changes to penetrate through the imprinted sheet or web material or through an air gap into the magnetic coating to be oriented. The magnetic dipole far-field, corresponding to the locally produced N-S-N (respectively S-N-S) transitions, decreases noteworthy with the third power of the distance. Typical papers have a thickness of the order of 100 micrometers. The minimal largeness and deepness of the engraved features, e.g. an engraved line, should preferably exceed the thickness of the said sheet or web. Preferably the size of the engraved features is at least twice the thickness of the carrier. The engraving can furthermore be of any profile; noteworthy triangular, semicircular, or rectangular. Rectangular profiles are preferred, as they allow for a sharp feature definition (resolution). Deeper engraving will furthermore result in a higher local magnetic field change, and is thus a preferred option.

In another aspect, the invention discloses a method for transferring predeterminable indicia, such as a magnetic design or an image, onto a printed document. Said method comprises the steps of a) applying a layer of an ink or a coating composition to at least a part of a first surface of a sheet or web, said ink or coating composition comprising at least one type of magnetic or magnetizable particles;

b) exposing the coated sheet or web of step a), while the applied ink or coating composition is wet, to the magnetic field at the surface of a body of a permanent-magnetic material, said body carrying predeterminable indicia in the form of surface irregularities, thereby allowing the said magnetic or magnetizable particles to orient in the said magnetic field;

c) hardening the ink or coating composition, thereby irreversibly fixing the orientation of the oriented magnetic particles of step b);

wherein the body of permanent-magnetic material is permanently magnetized, the magnetization being preferably oriented in a direction substantially perpendicular to the indicia-carrying surface.

The present invention discloses as well a method for continuously transferring, on a printing press, predeterminable indicia, such as a design or an image, onto a printed document, said method comprising the steps of:

a) mounting a thin, plate-like device around a rotatable cylinder, said plate-like device comprising a body of a permanent-magnetic material carrying predeterminable indicia in the form of surface irregularities, preferably a gravure defining a design or an image on said surface, such that said surface is located at the outer surface of the cylinder;

b) imprinting at least a part of a first surface of a sheet or web with an ink, said ink comprising at least one type of magnetic or magnetizable particles;

c) exposing the imprinted sheet or web of step b), while the printed ink is wet, to the magnetic field at the surface of said body and allowing the said magnetic or magnetizable particles to orient in the said field;

d) hardening the ink, thereby irreversibly fixing the orientation of the oriented magnetic particles of step c);

wherein the body of permanent-magnetic material of the said plate-like device is permanently magnetized, the magnetization being preferably oriented in a direction substantially perpendicular to the indicia-carrying surface.

The step of exposing the applied ink or coating composition to the magnetic field of the body according to the invention corresponds, in the context of the present disclosure, to the step of bringing the coated or imprinted substrate, i.e. the sheet or web, sufficiently close to the engraved, magnetized surface of the said body. This approaching or bringing close together allows the magnetic particles in the printing or coating layer to orient themselves with respect to the magnetic field. Noteworthy, the sheet or web may practically be brought into mechanical contact with the said magnetized surface of the said body. Alternatively, a tiny air gap, or an intermediate separating layer may be provided.

In a particularly preferred embodiment, a second surface of the said sheet or web, opposite to the said imprinted or coated first surface, is approached to or brought into loosely contact with the engraved surface of the body of magnetized composite permanent-magnetic material.

The said body of magnetized composite material is preferably the body of the device as described above. In a further aspect of the invention, a method is claimed for producing the said device, the method comprising the steps of:

a) providing a device comprising an unmagnetized body of permanent-magnetic material, the body having at least one flat or curved surface;

b) creating irregularities on said surface, preferably by engraving predeterminable indicia into the said surface of the body of step a);

c) permanently magnetizing the engraved body of step b), preferably in a direction substantially perpendicular to the engraved surface.

In a variant, the method for producing the said device comprises the steps of:

a) providing a device comprising a permanently magnetized body of permanent-magnetic material, the body having at least one flat or curved surface and being magnetized preferably in a direction substantially perpendicular to the said surface;

b) creating irregularities on said surface, preferably by engraving predeterminable indicia into the said surface of the body of step a).

The said body of permanent-magnetic material is preferably a polymer-bonded composite as already described before. The engraving of said indicia is preferably performed by using ablation tools selected from the group comprising mechanical ablation tools, gaseous or liquid jet ablation tools, and laser ablation tools.

Said ink or coating composition comprising at least one type of magnetic particles is preferably a magnetic optically variable ink, comprising a magnetic optically variable pigment. Magnetic optically variable pigment useful to realize the invention comprises a stack of interference layers, wherein one of the layers, preferably the central layer, contains a magnetic material. For further details concerning the structure of magnetic optically variable pigments reference is made to the documents cited in the introduction, especially to U.S. Pat. No. 4,838,648, EP 686,675, WO 02/73250 and WO 03/00801.

The ink or coating composition is furthermore preferably selected from the group of liquid inks, comprising screen-printing inks, gravure inks and flexographic inks. Liquid inks have typical viscosity values in the range of 0.1 to 5 Pa*s at 20° C., and allow for an easy orientation of the magnetic pigment.

Curing mechanisms for hardening the ink can be based on solvent or water evaporation, as well as on UV-curing or on hybrid curing mechanisms including evaporation of diluents, UV-curing and other reticulation reactions, such as oxypolymerization and crosslinking reactions.

The method according to the present invention allows to realize magnetic designs in magnetic and magnetic optically variable ink, which achieve an unprecedented graphical resolution. It is possible to write, e.g. text in the form of a magnetic design into an optically variable field, printed with a liquid-ink, e.g. a screen-printing ink. Said text may optically appear in a kind of relief (3D-effect), although the printing itself remains geometrically flat. The method is preferably used for the production of a bank note, a value paper, an official document, a tax excise stamp, a label, a foil, a thread or a decal; the products resulting of the application of the herein disclosed method being furthermore easily recognizable as such.

DRAWINGS

The invention is now further illustrated with the help of the drawings and the exemplary embodiments. The figures show:

FIG. 1 magnetic field simulations (realized with the publicly available program *Vizimag* 2.5, John Stuart Breeteson, 2003):
  a) a cross section with magnetic field lines through a rectangular engraving in a vertically magnetized permanent-magnetic plate;
  b) a cross section through a similar rectangular engraving in a vertically magnetized permanent-magnetic plate, filled up with soft-magnetic iron ($\mu=2000$);
  c) a cross section with magnetic field lines through a similar rectangular engraving in a soft-magnetic iron plate ($\mu=2000$), magnetized by an underlying permanent magnet.

FIG. 2 a) an engraved pattern in a Plastoferrite flexible magnetic plate, magnetized perpendicular to the sheet extension;
  b) a transferred magnetic pattern into a screen-printed patch of magenta-to-green optically variable magnetic ink (scale in centimeters).

FIG. 3 a) an engraved pattern in a Plastoferrite flexible magnetic plate, magnetized perpendicular to the sheet extension;
  b) a transferred magnetic pattern into a flexography printed patch of green-to-blue optically variable magnetic ink (scale in centimeters).

FIG. 4 a) an engraved pattern in a Plastoferrite flexible magnetic plate, magnetized perpendicular to the sheet extension;
  b) a transferred magnetic pattern into an UV-curing screen-printed patch of soft-magnetic ink (scale in centimeters).

Figure 5A:
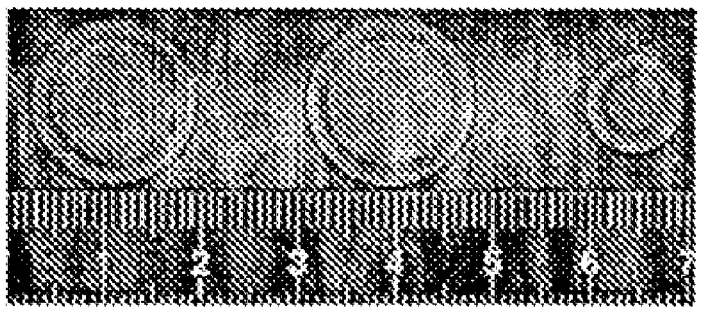

FIG. 5 a) an engraved pattern in a Plastoferrite flexible magnetic plate, magnetized perpendicular to the sheet extension;
  b) a transferred magnetic pattern into a gravure printed patch of coercive magnetic ink (scale in centimeters).

EXEMPLARY EMBODIMENTS

Example 1

Figure 2A:
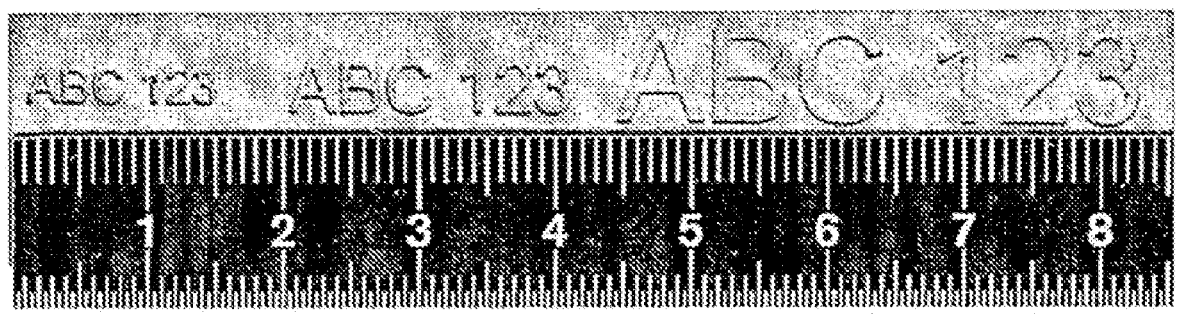

A Plastoferrite plate, magnetised in a direction perpendicular to the surface (model M100.8, Maurer magnetics AG, CH-8627 Grüningen), was engraved on a computer-controlled mechanical engraving station with text of different sizes (see FIG. 2a). The characteristics of these engraving were as follows:

Text height and width: form 3 to 7 mm
Depth of engraving: 150 μm for the smallest characters, up to 250 μm for the largest
Line width: from 200 μm for the smallest characters to 800 μm for the largest An OVI® silkscreen ink of the following formula, comprising a magnetic optically variable pigment, was prepared:

| Diethyl ketone | 23% |
| Ethyl diglycol | 29% |
| Solution Vinyl VMCA (Union Carbide) | 22% |
| BYK-053 (BYK) | 1% |
| Magnetic Optically Variable Pigment* | 25% |

*magenta-to-green, 7 layers design as disclosed in WO 02/73250: Cr/MgF$_2$/Al/Fe—Ni/Al/MgF$_2$Cr. The Fe—Ni alloy was 85% Fe/15% Ni.

The vinyl resin was dissolved in the ketone-glycol solvent prior to the incorporation of the additive and the pigment. The viscosity is adjusted with the same solvent blend so as to reach the value of 1 Pa·s at 25° C. Supplementary antifoaming agent may be necessary to run the ink on certain printing presses.

The ink was applied in the form of a screen-printed patch onto a standard coated paper (80 g/m$^2$), and the so imprinted paper was laid, while still wet, onto the engraved magnetic plate described above, exposing the back side of the imprinted paper to the engraved top side of the magnetic plate. The ink was then dried in situ using a flow of hot air.

Figure 2B:
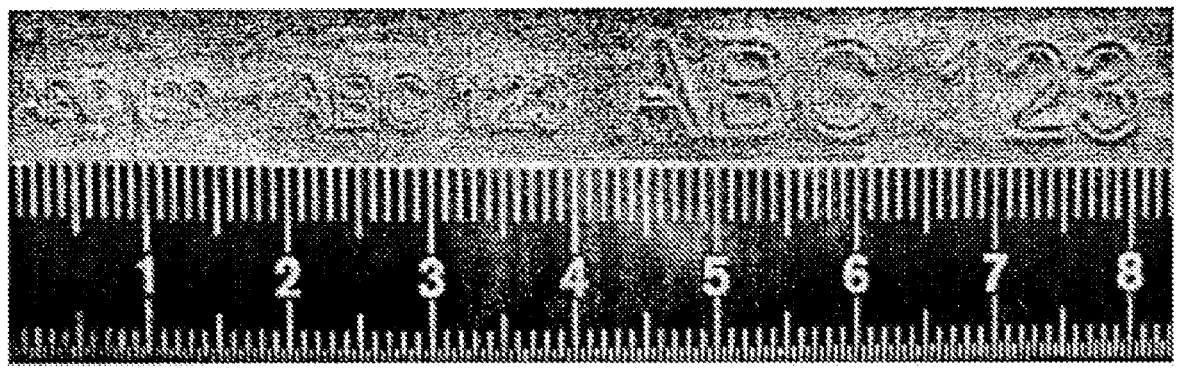

FIG. 2b shows that the engraved design of the magnetic plate has been transferred with high resolution into the magnetic optically variable ink patch; this latter shows some kind of 3-dimensional effect and a seems to move when the print is looked at from different angles.

Example 2

Figure 3A:
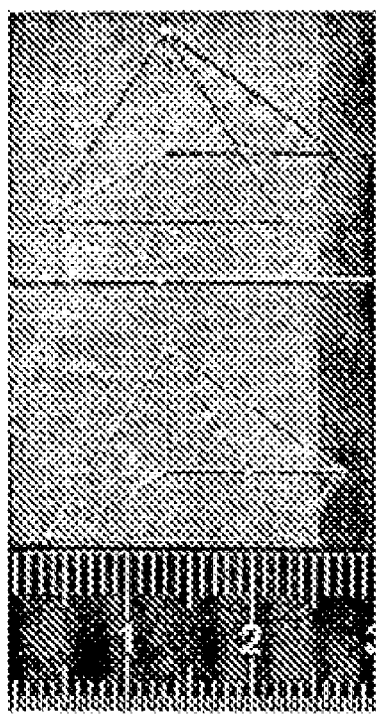

A Plastoferrite plate (model M201.1, Maurer magnetics AG, CH-8627 Grüningen) was magnetised in a direction perpendicular to the surface and then engraved on a computer-controlled mechanical engraving station with a geometrical design (two pyramids; see FIG. 3a). The characteristics of the engraving were as follows:

| Height and width: | 1.5 × 2.4 cm |
| Depth of engraving: | 200 μm |
| Line width: | 200 μm |

The engraving corresponding to the upper pyramid was filled up with a polymer, so as to result in an even surface of the engraved plate; the engraving corresponding to the lower pyramid was left as such.

An OVI® flexography ink comprising a magnetic optically variable pigment of the following formula was prepared:

| Neocryl BT-105 (Avecia) | 41.5% |
| Deionised water | 18% |
| Dowanol DPM (Dow) | 6% |
| AMP-95 ™ (Angus Chemie GmbH) | 1.5% |
| Neocryl BT-100 | 7% |
| Tego Foamex 800 (Tego Chemie Service GmbH) | 0.5% |

-continued

| Aerosil 200 (Degussa) | 0.5% |
| Magnetic Optically Variable Pigment* | 25% |

*green-to-blue, 5 layers design, Cr/MgF$_2$/Ni/MgF$_2$/Cr as disclosed in patent US 4,838,648; obtained form FLEX Products Inc., Santa Rosa, CA.

The formula ingredients were dispersed together and the viscosity of the resulting mixture was adjusted with deionised water to reach the value of 20-40 s DIN4 at 25° C.

The so obtained ink was applied in the form of a patch onto standard security paper (100 g/m$^2$) and the imprinted paper was further processed as described in example 1.

Figure 3B:
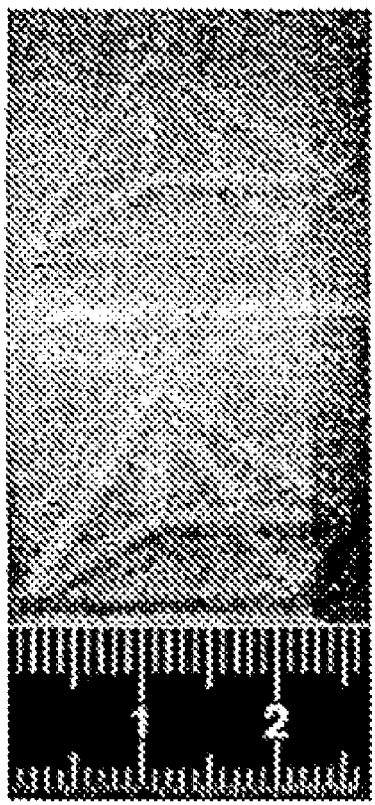

FIG. 3b shows that the engraved design in the plate has been transferred into the ink patch with good resolution, which remains substantially unchanged by the filling of the engraving with a polymer.

Example 3

Figure 4A:
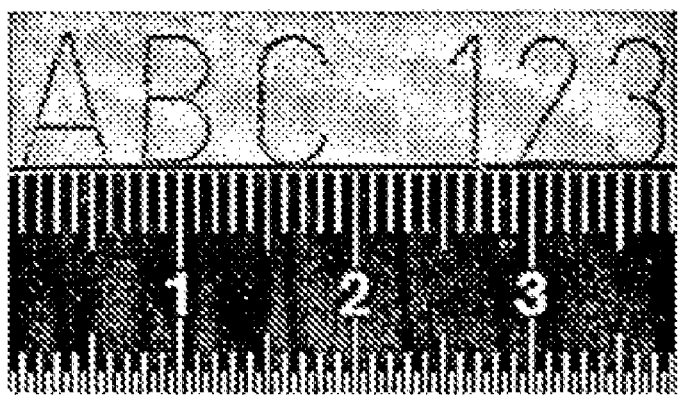
Figure 4B:
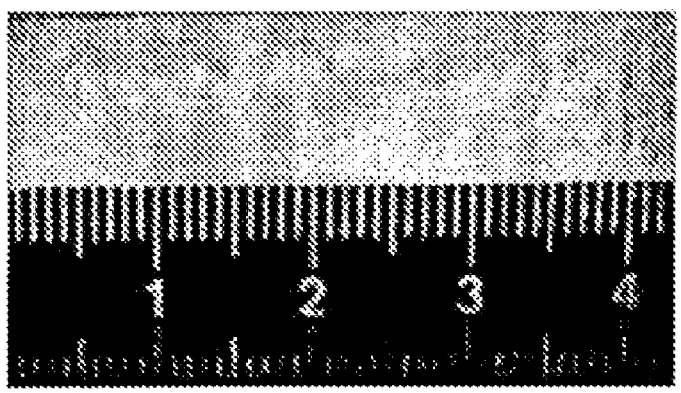

A Plasto-ferrite plate as used in example 1 was engraved on a computer-controlled mechanical engraving station with text (see FIG. 4a). The characteristics of the engraving were as follows:

| Text height and width: | 7 mm |
| Depth of engraving: | 250 μm |
| Line width: | 300 μm |

An UV drying soft-magnetic screen ink without optically variable properties was prepared according to the following formula and known procedures:

| Epoxyacrylate oligomer | 37.5% |
| Trimethylolpropane triacrylate monomer | 14% |
| Tripropyleneglycol diacrylate monomer | 14% |
| Genorad 16 (Rahn) | 1% |
| Fine iron powder | 25% |
| Aerosil 200 (Degussa-Heuls) | 1% |
| Irgacure 500 (CIBA) | 6% |
| Genocure EPD (Rahn) | 2% |

A patch of the ink was screen-printed on a white PVC support (100 g/m$^2$) and the imprinted support was processed as described in example 1, except that the ink was dried in situ using an UV-radiation curing unit.

FIG. 4b shows that again, the design engraved in the plate has been transferred to the soft-magnetic ink patch; the latter shows a 3-dimensional effect and a seems to move when the print is looked at from different angles.

Example 4

A Plasto-ferrite plate as used in example 1 was engraved on a computer-controlled mechanical engraving station with a hollow circle. In its centre a similar motif of a smaller diameter was deeper engraved (see FIG. 5a). The characteristics of the engraving were the following:

| First circles diameters: | 2 and 1.2 cm |
| Depth of engraving of the first disc: | 150 μm |
| Second circles diameters: | 1.5 and 0.7 cm |
| Depth of engraving of the second disc: | 250 μm |

A coercive magnetic gravure ink was prepared according to the following formula, and using known procedures:

| | |
|---|---|
| Ethanol | 25% |
| Ethyl acetate | 25% |
| Dicyclohexylphtalate (Unimoll 66, Bayer) | 5% |
| Fumaric acid modified rosin (ERKAMAR 3270, Robert Kraemer GmbH & Co) | 5% |
| Polyvinylbutyral resin (Pioloform BN18, Wacker-Chemie GmbH) | 13% |
| Magnetic pigment 345 BASF | 15% |
| Ethanol | 4% |
| Ethyl acetate | 8% |

The resins were dissolved in the solvents prior to the incorporation of the pigment. The viscosity was adjusted with solvent blend to reach the value of 20-40 s DIN4 at 25° C.

The ink was applied in the form of a patch on a standard security paper (100 g/m$^2$) and the imprinted paper was further processed as described in example 1.

Figure 5B:
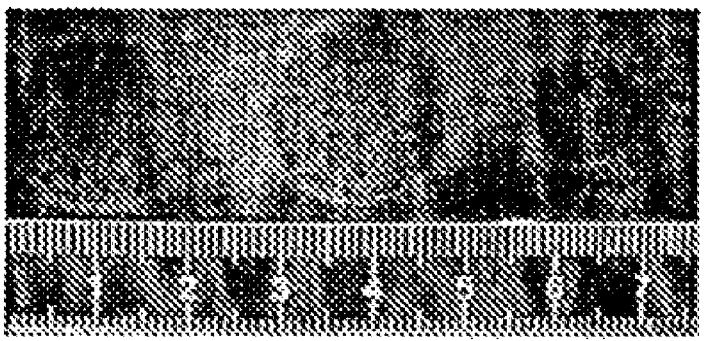

FIG. 5b shows that the design engraved in the plate has even here been transferred to the ink patch; the latter shows a 3-dimensional effect and a seems to move when the print is looked at from different angles.

The invention claimed is:

1. A device for magnetically transferring indicia to a wet coating composition applied to a substrate, said wet coating composition comprising at least one type of magnetic or magnetizable particles, and said device comprising a body of permanent-magnetic material, the body of permanent-magnetic material being permanently magnetized in a direction substantially perpendicular to a surface of said body of permanent-magnetic material, wherein
the surface of said body of permanent-magnetic material carries the indicia in the form of engravings, causing perturbations of its magnetic field, and
said body of permanent-magnetic material is either a flat plate or a cylindrically curved plate.

2. The device according to claim 1, wherein said indicia is a design or an image.

3. The device according to claim 1, wherein said substrate is a sheet or a web.

4. The device according to claim 1, wherein said body of permanent-magnetic material is mounted on a rotatable cylinder on a printing machine.

5. The device according to claim 1, wherein the body of permanent-magnetic material is a polymer-bonded composite which comprises a macromolecular polymer and a permanent-magnetic powder, said permanent-magnetic powder being selected from the group of magnetic materials consisting of cobalt, iron, and their alloys, chromium dioxide, magnetic oxide spinels, magnetic garnets, magnetic ferrites including magnetic hexaferrites, alnico alloys, samarium-cobalt alloys, and rare-earth-iron-boron alloys.

6. The device according to claim 1, wherein said body of permanent-magnetic material is mounted on a support.

7. The device according to claim 1, wherein said surface of said body of permanent-magnetic material carrying the indicia in the form of engravings is covered with a non-magnetic material.

8. The device according to claim 7, wherein said non-magnetic material fills up said engravings in said body.

9. The device according to claim 1, wherein said engravings in said body of permanent-magnetic material are filled up with a magnetic material.

10. The device according to claim 1, wherein said surface of said body of permanent-magnetic material carrying the indicia in the form of engravings is surface-treated, enabling a reduction of friction resistance and/or wear.

11. A method for magnetically transferring predeterminable indicia onto a printed document, comprising the steps of
a) applying a layer of an ink or a coating composition to at least a part of a first surface of a sheet or web, said ink or coating composition comprising at least one type of magnetic or magnetizable particles;
b) exposing the sheet or web of step a), while the ink or coating composition is wet, to a magnetic field at a surface of a body of permanent-magnetic material, said body of permanent-magnetic material being either a flat plate, or a cylindrically curved plate, and said surface of said body of permanent-magnetic material is carrying predeterminable indicia in form of engravings, thereby allowing the said magnetic or magnetizable particles to orient in the said magnetic field; and
c) hardening the ink or coating composition, thereby irreversibly fixing the orientation of said magnetic or magnetizable particles of step b);
wherein the body of permanent-magnetic material is permanently magnetized in a direction substantially perpendicular to said surface of said body of permanent-magnetic material and said predeterminable indicia in said surface cause perturbations of said magnetic field.

12. The method according to claim 11, wherein said predeterminable indicia is a design or an image.

13. The method according to claim 11, wherein said body of permanent-magnetic material is mounted on a rotatable cylinder on a printing machine.

14. The method according to claim 11, wherein a second surface of said sheet or web, opposite to said first surface, is exposed to said magnetic field of the surface of the body of permanent-magnetic material.

15. The method according to claim 11, wherein said body of permanent-magnetic material is a polymer-bonded composite which comprises a macromolecular polymer and a permanent-magnetic powder, wherein the permanent-magnetic powder is selected from the group of magnetic materials consisting of cobalt, iron, and their alloys, chromium dioxide, magnetic oxide spinels, magnetic garnets, magnetic ferrites including magnetic hexaferrites, alnico alloys, samarium-cobalt alloys, and rare-earth-iron-boron alloys.

16. The method according to claim 11, wherein said surface of said body of permanent-magnetic material is surface-treated for the reduction of friction resistance and/or wear.

17. The method according to claim 11, wherein said engravings in said surface are filled up with a magnetic or a non-magnetic material.

18. The method according to claim 11, wherein the ink or coating composition is selected from the group of inks consisting of screen-printing inks, gravure inks, and flexographic inks.

19. The method according to claim 11, wherein said at least one type of magnetic particles is a magnetic optically variable pigment.

20. The method according to claim 11, wherein said sheet or web is used for the production of a bank note, a value paper, an official document, a tax excise stamp, a label, a foil, a thread or a decal.

21. A method for continuously magnetically transferring, on a printing press, predeterminable indicia onto a printed document, comprising the steps of a) mounting a device around a rotatable cylinder, said device comprising a body of a permanent-magnetic material carrying the predeterminable indicia in the form of engravings at a surface, such that said surface is located at an outer surface of the rotatable cylinder;

b) imprinting at least part of a first surface of a sheet or web with an ink, said ink comprising at least one type of magnetic or magnetizable particles;

c) exposing the sheet or web of step b), while the ink is wet, to a magnetic field at said surface of said body of permanent-magnetic material thereby allowing said magnetic or magnetizable particles to orient in said magnetic field; and d) hardening the ink, thereby irreversibly fixing the orientation of the magnetic or magnetizable particles of step c);

wherein the body of permanent-magnetic material is either a flat plate or a cylindrically curved plate and is permanently magnetized in a direction substantially perpendicular to said surface of said body of permanent-magnetic material, and said predeterminable indicia in said surface cause perturbations of said magnetic field.

22. The method according to claim 21, wherein said predeterminable indicia is a design or an image.

23. The method according to claim 21, wherein a second surface of said sheet or web, opposite to said first surface, is exposed to said magnetic field of the surface of the body of permanent-magnetic material.

24. The method according to claim 21, wherein said body of permanent-magnetic material is a polymer-bonded composite which comprises a macromolecular polymer and a permanent-magnetic powder, wherein the permanent-magnetic powder is selected from the group of magnetic materials consisting of cobalt, iron, and their alloys, chromium dioxide, magnetic oxide spinels, magnetic garnets, magnetic ferrites including magnetic hexaferrites, alnico alloys, samarium-cobalt alloys, and rare-earth-iron-boron alloys.

25. The method according to claim 21, wherein said surface of said body of permanent-magnetic material is surface treated for the reduction of friction resistance and/or wear.

26. The method according to claim 21, wherein said engravings in said surface are filled up with a magnetic or a non-magnetic material.

27. The method according to claim 21, wherein the ink or coating composition is selected from the group of inks consisting of screen-printing inks, gravure inks, and flexographic inks.

28. The method according to claim 21, wherein said at least one type of magnetic particles is a magnetic optically variable pigment.

29. The method according to claim 21, wherein said sheet or web is used for the production of a bank note, a value paper, an official document, a tax excise stamp, a label, a foil, a thread or a decal.

30. A printed product, comprising at least one coating layer, said at least one coating layer further comprising at least one type of magnetic optically variable pigment particles, characterized in that indicia are embodied in said at least one coating layer through a selective orientation of said magnetic optically variable pigment particles, as a result of an exposure of said coating layer to the magnetic field at the surface of the device according to claim 1 while said at least one coating layer is wet, followed by hardening said at least one coating layer.

31. The printed product according to claim 30, wherein said printed product is a bank note, a value paper, an official document, a tax excise stamp, a label, a foil, a thread, or a decal.

32. A method for producing the device according to claim 1, comprising the steps of:

a) providing a device comprising an unmagnetized body of permanent-magnetic material, the unmagnetized body of permanent-magnetic material having at least one flat or cylindrically curved surface;

b) engraving predeterminable indicia into said at least one flat or cylindrically curved surface of the unmagnetized body of permanent-magnetic material of step a); and c) permanently magnetizing the unmagnetized body of permanent-magnetic material of step b) in a direction substantially perpendicular to the at least one flat or cylindrically curved surface.

33. The method for producing the device according to claim 32, wherein said body of permanent-magnetic material is a polymer-bonded composite, which comprises a macromolecular polymer and a permanent-magnetic powder, wherein the permanent-magnetic powder is selected from the group of magnetic materials consisting of cobalt, iron, and their alloys, chromium dioxide, magnetic oxide spinels, magnetic garnets, magnetic ferrites including magnetic hexaferrites, alnico alloys, samarium-cobalt alloys, and rare-earth-iron-boron alloys.

34. The method for producing the device according to claim 33, wherein said engraving of the predeterminable indicia is performed by a tool selected from the group consisting of mechanical ablation tools, gaseous-jet ablation tools, liquid-jet ablation tools, and laser ablation tools.

35. A method for producing the device according to claim 1, comprising the steps of:

a) providing a device comprising a permanently magnetized body of permanent-magnetic material, the permanently magnetized body of permanent-magnetic material having at least one flat or cylindrically curved surface, and being magnetized in a direction substantially perpendicular to said at least one flat or cylindrically curved surface; and b) engraving predeterminable indicia into said at least one flat or cylindrically curved surface of the permanently magnetized body of permanent-magnetic material of step a).

36. The method for producing the device according to claim 35, wherein said body of permanent-magnetic material is a polymer-bonded composite, which comprises a macromolecular polymer and a permanent-magnetic powder, wherein the permanent-magnetic powder is selected from the group of magnetic materials consisting of cobalt, iron, and their alloys, chromium dioxide, magnetic oxide spinels, magnetic garnets, magnetic ferrites including magnetic hexaferrites, alnico alloys, samarium-cobalt alloys, and rare-earth-iron-boron alloys.

37. The method for producing the device according to claim 36, wherein said engraving of the predeterminable indicia is performed by a tool selected from the group consisting of mechanical ablation tools, gaseous-jet ablation tools, liquid-jet ablation tools, and laser ablation tools.

* * * * *